(12) United States Patent
Hao

(10) Patent No.: US 11,451,510 B2
(45) Date of Patent: Sep. 20, 2022

(54) METHOD AND APPARATUS FOR PROCESSING SERVICE REQUEST

(71) Applicant: ZTE CORPORATION, Guangdong (CN)

(72) Inventor: Zhenwu Hao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/958,982

(22) PCT Filed: Dec. 27, 2018

(86) PCT No.: PCT/CN2018/124419
§ 371 (c)(1),
(2) Date: Jun. 29, 2020

(87) PCT Pub. No.: WO2019/129154
PCT Pub. Date: Jul. 4, 2019

(65) Prior Publication Data
US 2020/0344208 A1 Oct. 29, 2020

(30) Foreign Application Priority Data
Dec. 27, 2017 (CN) .......................... 201711444514.6

(51) Int. Cl.
*G06F 15/16* (2006.01)
*G06F 9/54* (2006.01)
(Continued)

(52) U.S. Cl.
CPC ...... *H04L 61/2567* (2013.01); *H04L 61/2525* (2013.01); *H04L 61/4511* (2022.05); *H04L 61/4552* (2022.05)

(58) Field of Classification Search
CPC ............. H04L 61/2567; H04L 61/1511; H04L 61/1552; H04L 61/2525
(Continued)

(56) References Cited

U.S. PATENT DOCUMENTS 8,279,776 B1 * 10/2012 Everson .............. H04L 61/2514
370/401
10,447,710 B1 * 10/2019 Li ....................... H04L 63/0876
(Continued)

FOREIGN PATENT DOCUMENTS

| CN | 104378363 A | 2/2015 |
| CN | 104506511 A | 4/2015 |

(Continued)

OTHER PUBLICATIONS

J. H. Jafarian, E. Al-Shaer and Q. Duan, "An Effective Address Mutation Approach for Disrupting Reconnaissance Attacks," in IEEE Transactions on Information Forensics and Security, vol. 10, No. 12, pp. 2562-2577, Dec. 2015, doi: 10.1109/TIFS.2015. 2467358. (Year: 2015).*

(Continued)

*Primary Examiner* — Hamza N Algibhah
(74) *Attorney, Agent, or Firm* — Li & Cai Intellectual Property (USA) Office

(57) ABSTRACT

The present disclosure provides a method and an apparatus for processing a service request. The method includes: sending a query request for querying a domain name of a server to a DNS; receiving a query response returned according to the query request, where the query response carries a first identifier of an IDGW; sending a service request to the IDGW according to the first identifier, where the service request is used for the IDGW to convert the first identifier into a second identifier of the server and forward the service request to the server according to the second
(Continued)

identifier; and receiving a service response message returned from the server in response to the service request.

8 Claims, 9 Drawing Sheets

(51) Int. Cl.
    *H04L 29/06*     (2006.01)
    *H04L 61/2567*     (2022.01)
    *H04L 61/2521*     (2022.01)
    *H04L 61/4511*     (2022.01)
    *H04L 61/4552*     (2022.01)

(58) Field of Classification Search
    USPC .......................................................... 709/245
    See application file for complete search history.

(56) References Cited

U.S. PATENT DOCUMENTS

| | | | |
|---|---|---|---|
| 11,294,777 B2* | 4/2022 | Venkatesh | G06F 3/0619 |
| 2006/0258356 A1* | 11/2006 | Maxwell | H04L 29/12047 |
| | | | 455/436 |
| 2015/0372972 A1* | 12/2015 | Kennedy | H04L 61/1511 |
| | | | 709/245 |
| 2015/0381561 A1* | 12/2015 | Meltzer | H04L 51/066 |
| | | | 709/206 |
| 2016/0285913 A1 | 9/2016 | Itskin et al. | |
| 2017/0195295 A1* | 7/2017 | Tatlicioglu | H04L 63/0414 |
| 2018/0302438 A1* | 10/2018 | Robertson | H04L 63/20 |

FOREIGN PATENT DOCUMENTS

| | | |
|---|---|---|
| CN | 104601456 A | 5/2015 |
| CN | 104853003 A | 8/2015 |
| CN | 105141641 A | 12/2015 |
| CN | 105429957 A | 3/2016 |
| CN | 106161670 A | 11/2016 |
| CN | 106302525 A | 1/2017 |
| WO | WO 2012048206 A2 | 4/2012 |

OTHER PUBLICATIONS

European Patent Office, EESR dated Jul. 16, 2021; Corresponding to EP Application No. 18894658.6.

Jafar Haadi, et al. "Multi-dimensional Host Indentity Anonymization for Defeating Skilled Attackers", dated Oct. 24, 2016, Moving Target Defence, ACM, 2 Penn Plaza, pp. 47-58.

Shue Graig A., et al., "On building inexpensive network capabilities", dated Mar. 29, 2012, Computer Communication Review., vol. 42, No. 2.

Cybenko George, et al., "The SDN Shuffle Creating a Moving Target Defense using Host-based Software-Defined Networking", Oct. 12, 2015,Proceedings of Second ACM Workshop on Moving Target Defense, pp. 37-41.

China Patent Office, First Office Action dated Mar. 5, 2021, for corresponding Chinese application No. 201711444514.6.

WIPO, International Search Report dated Mar. 5, 2019.

* cited by examiner

METHOD AND APPARATUS FOR PROCESSING SERVICE REQUEST

CROSS-REFERENCE TO RELATED APPLICATIONS

This is a National Phase Application filed under 35 U.S.C. 371 as a national stage of PCT/CN2018/124419, filed on Dec. 27, 2018, an application claiming the priority of Chinese Patent Application No. 201711444514.6, filed on Dec. 27, 2017, the contents of which are incorporated herein in their entirety by reference.

TECHNICAL FIELD

The present application relates to the field of communications, and in particular to a method and an apparatus for processing a service request.

BACKGROUND

Moving Target Defense (MTD) is a novel network security protection idea that performs continuous dynamic transformation on an attacked surface of a protected target presented to an attacker through technical means to confuse the attacker, thereby increasing the cost and complexity of implementing successful attack by the attacker, reducing the probability of successful attack, and improving elasticity and security of the system.

The idea of MTD is applied to an IP network, and makes an attacked surface of an attacked target in continuous and random changes by changing communication parameters of the network so that an attacker cannot effectively identify a target node or a service entrance, thereby preventing occurrence of network attacks. The communication parameters here mainly refer to the IP address and the communication port of a target host, where the IP address represents an identity of the host in the network, the communication port represents different communication connections of the host, and communication connections between hosts can be established through the IP address and the port. The IP address, or IP address plus port, is referred to herein collectively as an identifier that can identify a host or a service entrance provided by a host.

A typical service access model of the internet is Client-Server. FIG. 1 is a block diagram of a client accessing a server in the related art. As shown in FIG. 1, the client, based on a domain name of the server, acquires an IP address of the server from a Domain Name Server (DNS), then finds the server through the IP address, and establishes connection through an open communication port of the server to acquire services provided by the server. Communication parameters of the terminal are generally changeable, and in order to provide services for different terminals, information about the IP address and the communication port of the server in the network needs be public and stable, which provides convenience for an attacker who specifically attacks the server from a controlled client or an attacked client by using the public information about the IP address and the port of the server.

The existing moving target defense technology mainly aims at protecting a client, but for a server, if a similar method is adopted to randomly change the communication parameters of the server, it will be impossible for a terminal to find an entrance of the server or service, thereby affecting normal services.

For the problem that normal services are affected when a server randomly changes a parameter in the related art, no solution has been provided yet.

SUMMARY

Embodiments of the present disclosure provide a method and an apparatus for processing a service request, so as to at least solve the problem in the related art that normal services are affected when a server randomly changes a parameter.

According to an embodiment of the disclosure, there is provided a method for processing a service request, including: sending a query request for querying a domain name of a server to a DNS; receiving a query response returned according to the query request, where the query response carries a first identifier of an Identification Gateway (IDGW); sending a service request to the IDGW according to the first identifier, where the service request is used for the IDGW to convert the first identifier into a second identifier of the server and forward the service request to the server according to the second identifier; and receiving a service response message returned from the server in response to the service request.

According to another embodiment of the disclosure, there is further provided a method for processing a service request, including: receiving a query request for querying a domain name of a server sent from a client; and returning a query response to the client according to the query request, where the query response carries a first identifier of an IDGW, the first identifier is used for the client to send a service request to IDGW, the service request is used for the IDGW to convert the first identifier into a second identifier of the server and forward the service request to the server according to the second identifier, and forward a service response message returned from the server in response to the service request to the client.

According to still another embodiment of the disclosure, there is further provided a method for processing a service request, including: receiving a query request for querying a domain name of a server, and returning a query response to a DNS or a client according to the query request, where the query response carries a first identifier of an IDGW; receiving a service request sent from the client according to the first identifier; converting the first identifier into a second identifier of the server, and forwarding the service request to the server according to the second identifier; and forwarding a service response message returned from the server in response to the service request to the client.

According to another embodiment of the disclosure, there is further provided an apparatus for processing a service request, which is applied to a client and includes: a first sending module configured to send a query request for querying a domain name of a server to a DNS; a first receiving module configured to receive a query response returned according to the query request, where the query response carries a first identifier of an IDGW; a second sending module configured to send a service request to the IDGW according to the first identifier, where the service request is used for the IDGW to convert the first identifier into a second identifier of the server and forward the service request to the server according to the second identifier; and a second receiving module configured to receive a service response message returned from the server in response to the service request.

According to still another embodiment of the disclosure, there is further provided an apparatus for processing a service request, which is applied to a DNS and includes: a third receiving module configured to receive a query request for querying a domain name of a server sent from a client; and a return module configured to return a query response to the client according to the query request, where the query response carries a first identifier of an IDGW, the first identifier is used for the client to send a service request to the IDGW, the service request is used for the IDGW to convert the first identifier into a second identifier of the server and forward the service request to the server according to the second identifier, and forward a service response message returned from the server in response to the service request to the client.

According to still another embodiment of the disclosure, there is further provided an apparatus for processing a service request, which is applied to an IDGW and includes: a fourth receiving module configured to receive a query request for querying a domain name of a server, and return a query response to a DNS or a client according to the query request, where the query response carries a first identifier of the IDGW; a fifth receiving module configured to receive a service request sent from the client according to the first identifier; a first forwarding module configured to convert the first identifier into a second identifier of the server, and forward the service request to the server according to the second identifier; and a second forwarding module configured to forward a service response message returned from the server in response to the service request to the client.

According to still another embodiment of the disclosure, there is further provided a storage medium having a computer program stored thereon, where the computer program, when executed by a processor, cause the processor to perform the method as described above.

According to still another embodiment of the disclosure, there is further provided an electronic device, including a memory and a processor, where the memory has a computer program stored thereon, and the processor is configured to execute the computer program to implement the method as described above.

According to the present disclosure, by introducing the Identification Gateway, the communication parameters of the server are altered without affecting normal services, thereby solving the problem in the related art that normal services are affected when a server randomly changes a parameter, realizing active protection of a target server, and improving security of the entire server system.

BRIEF DESCRIPTION OF THE DRAWINGS

The drawings described herein are intended to provide a further understanding of the present disclosure, and are a part of the present disclosure. The exemplary embodiments of the present disclosure and the description thereof are for explaining the present disclosure and do not constitute an undue limitation of the present disclosure. In the drawings.

DETAILED DESCRIPTION

The disclosure will be described in detail below with reference to the drawings in conjunction with the embodiments. It should be noted that the embodiments of the disclosure and features therein may be combined with each other in any manner as long as they are not contradictory.

It should be also noted that terms "first", "second", and the like in the description, claims and drawings of the disclosure are used for the purpose of distinguishing similar objects instead of indicating a specific order or sequence.

Embodiment 1

Figure 1:
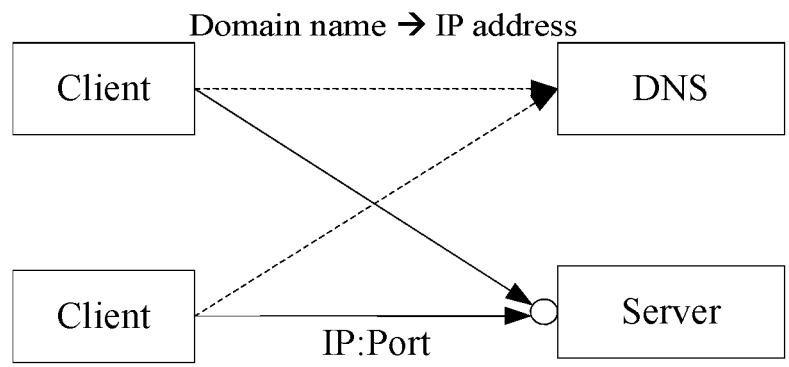
FIG. 1 is a block diagram of a client accessing a server in the related art.
Figure 2:
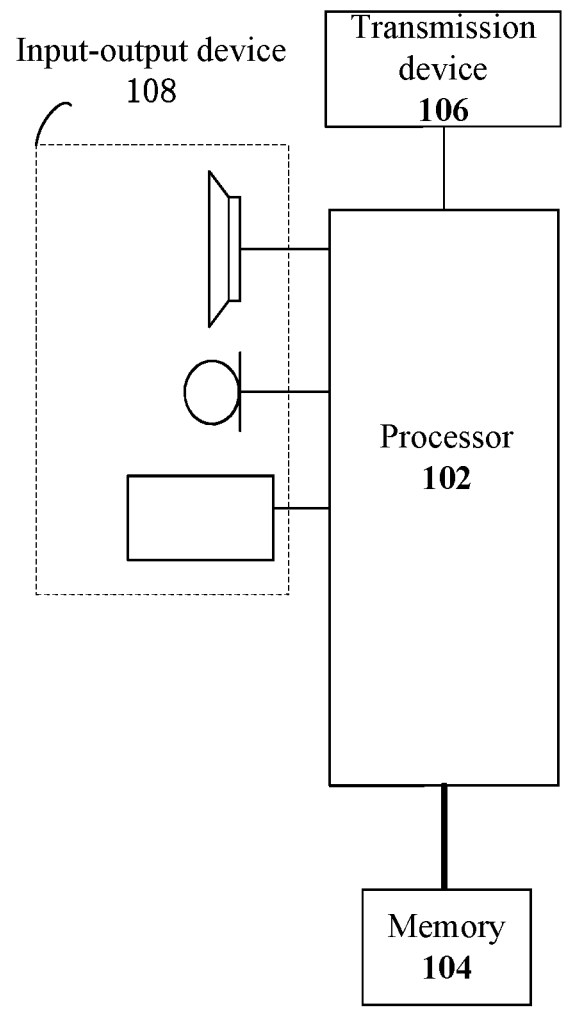
FIG. 2 is a block diagram of a hardware structure of a terminal used in a method for processing a service request according to an embodiment of the present disclosure.

The method embodiment provided in Embodiment 1 of the present disclosure may be implemented in a computing device, such as a mobile terminal, a computer terminal or the like. FIG. 2 is a block diagram of a hardware structure of a terminal used in a method for processing a service request according to an embodiment of the present disclosure. As shown in FIG. 2, a terminal 10 may include one or more processors 102 (only one processor is shown in FIG. 2) (the processor 102 may include, but is not limited to, a microprocessor (MCU) or a processing device of a programmable logic device such as FPGA) and a memory 104 configured to store data. Optionally, the terminal may further include a transmission device 106 for communication functions and an input-output device 108. It will be understood by those ordinary skilled in the art that the structure shown in FIG. 2 is merely illustrative, and does not form any limitation to the structure of the above terminal. For example, the terminal 10 may include more or fewer components than those shown in FIG. 2, or have a different configuration than that shown in FIG. 2.

The memory 104 may be configured to store a computer program, for example, a software program and a module of application software, such as the computer program corresponding to the method for processing a service request in the embodiments of the present disclosure. The processor 102 executes the computer program stored in the memory 104 to perform various functional applications and data processing, that is, implement the above method. The memory 104 may include a high speed random access memory and may also include a non-volatile memory such as one or more magnetic storage device, flash memory, or other non-volatile solid state memory. In some examples, the memory 104 may further include a memory remotely located relative to the processor 102, which may be connected to the terminal 10 via a network. Examples of such networks include, but are not limited to, the Internet, intranets, local area networks, mobile communication networks, and combinations thereof.

The transmission device 106 is configured to receive or transmit data via a network. Specific examples of such networks may include a wireless network provided by a communication provider of the terminal 10. In an example, the transmission device 106 includes a Network Interface Controller (NIC) that may be connected to another network device through a base station to communicate with the Internet. In an example, the transmission device 106 may be a Radio Frequency (RF) module configured to communicate with the Internet wirelessly.

Figure 3:
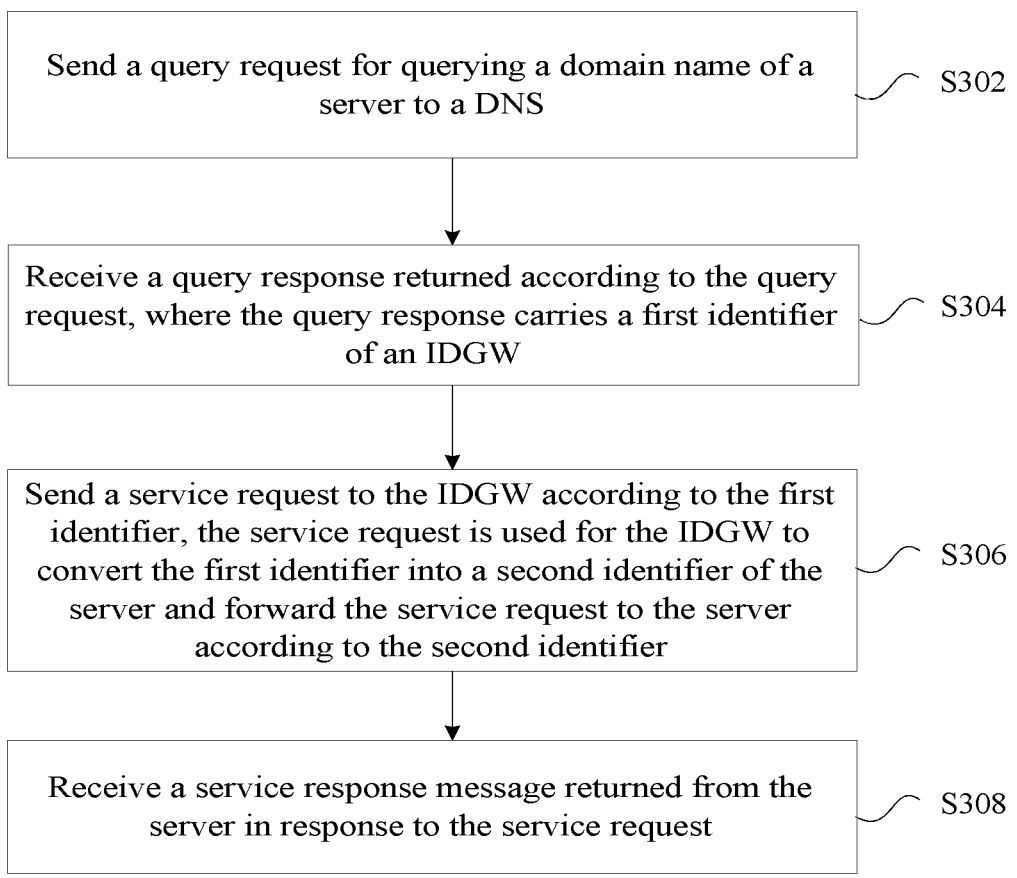
FIG. 3 is a first flowchart of a method for processing a service request according to an embodiment of the present disclosure.

In this embodiment, there is provided a method for processing a service request that is run on the above terminal. FIG. 3 is a first flowchart of a method for processing a service request according to an embodiment of the present disclosure. As shown in FIG. 3, the flow includes the following steps S302 to S308.

At step S302, a query request for querying a domain name of a server is sent to a DNS.

At step S304, a query response returned according to the query request is received, where the query response carries a first identifier of an IDGW.

At step S306, a service request is sent to the IDGW according to the first identifier, where the service request is used for the IDGW to convert the first identifier into a second identifier of the server and forward the service request to the server according to the second identifier.

At step S308, a service response message returned from the server in response to the service request is received.

In that, a terminal, e.g., a non-mobile terminal, may perform the above operations.

Through the above steps, the problem in the related art that normal services are affected when a server randomly changes a parameter is solved, thereby realizing active protection of a target server, and improving security of the entire server system.

In an embodiment of the present disclosure, the second identifier is acquired by: upon receiving the domain name request, the IDGW or DNS selects the first identifier, while requesting the IP address of the server, that is, the IP address information in the second identifier, from the Domain Name Server managing the server using the domain name of the server.

Optionally, the query request carries the domain name of the server to be queried and an IP address of a client.

Optionally, the step of sending the query request for querying the domain name of the server to the DNS includes: sending the query request to the DNS, where the query request is used for the DNS to select the IDGW according to the domain name of the server in a random or alternate manner, forward the query request to the selected IDGW so that the IDGW selects a first identifier from a first identifier pool, establishes a mapping relationship among the IP address of the client, the first identifier and the second identifier, and receive the first identifier selected by the IDGW.

Alternatively, the step of sending the query request for querying the domain name of the server to the DNS includes: sending the query request to the DNS, where the query request is used for the DNS to select an IDGW and a first identifier, establish a mapping relationship among the IP address of the client, the first identifier and the second identifier, and send the mapping relationship to the selected IDGW.

Optionally, the step of sending the query request for querying the domain name of the server to the DNS includes: sending the query request to the DNS, where the query request is used for the DNS to select the IDGW according to the domain name of the server in a random or alternate manner; receiving a response message returned from the DNS, where the response message is used for indicating that the query request is sent to the IDGW; and redirecting the query request to the IDGW according to the response message, where the query request is used for the IDGW to select the first identifier from a first identifier pool and establish a mapping relationship among the IP address of the client, the first identifier and the second identifier.

Optionally, each of the first identifier and the second identifier is an IP address, or an IP address plus a communication port.

Optionally, the domain name of the server includes one of: a domain name of a service, a host name of the server, and a communication port of a service.

Embodiment 2

Figure 4:
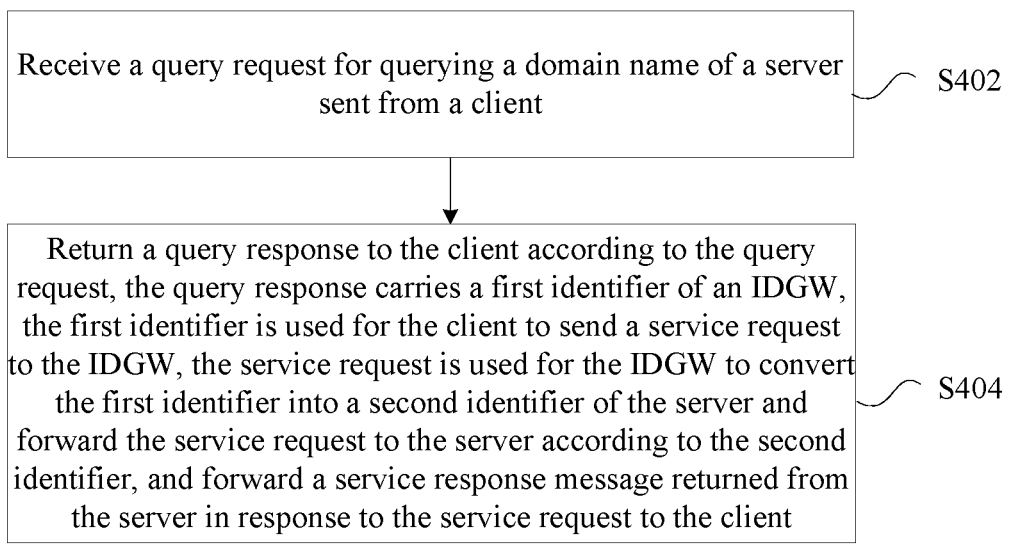
FIG. 4 is a second flowchart of a method for processing a service request according to an embodiment of the present disclosure.

According to another embodiment of the disclosure, there is further provided a method for processing a service request. FIG. 4 is a second flowchart of a method for processing a service request according to an embodiment of the present disclosure. As shown in FIG. 4, the flow includes the following steps S402 to S404.

At step S402, a query request for querying a domain name of a server sent from a client is received.

At step S404, a query response is returned to the client according to the query request, where the query response carries a first identifier of an IDGW, the first identifier is used for the client to send a service request to the IDGW, the service request is used for the IDGW to convert the first identifier into a second identifier of the server and forward the service request to the server according to the second identifier, and forward a service response message returned from the server in response to the service request to the client.

Optionally, the query request carries the domain name of the server to be queried and an IP address of the client.

Optionally, the step of returning the query response to the client according to the query request includes: selecting the IDGW according to the domain name of the server in a random or alternate manner; forwarding the query request to the selected IDGW, where the query request is used for the IDGW to select a first identifier from a first identifier pool and establish a mapping relationship among the IP address of the client, the first identifier and the second identifier; receiving the first identifier selected by the IDGW; and returning the query response to the client.

Optionally, the step of returning the query response to the client according to the query request includes: selecting an IDGW and a first identifier; establishing a mapping relationship among the IP address of the client, the first identifier and the second identifier, and sending the mapping relationship to the selected IDGW; and returning the query response to the client.

Optionally, the step of returning the query response to the client according to the query request includes: selecting the IDGW according to the domain name of the server in a random or alternate manner; returning a response message to the client, where the response message is used for the client to redirect the query request to the IDGW, the query request is used for the IDGW to select a first identifier from a first identifier pool and establish a mapping relationship among the IP address of the client, the first identifier and the second identifier; and returning the query response to the client through the IDGW.

Optionally, each of the first identifier and the second identifier is an IP address, or an IP address plus a communication port.

Optionally, the domain name of the server includes one of: a domain name of a service, a host name of the server, and a communication port of a service.

Embodiment 3

Figure 5:
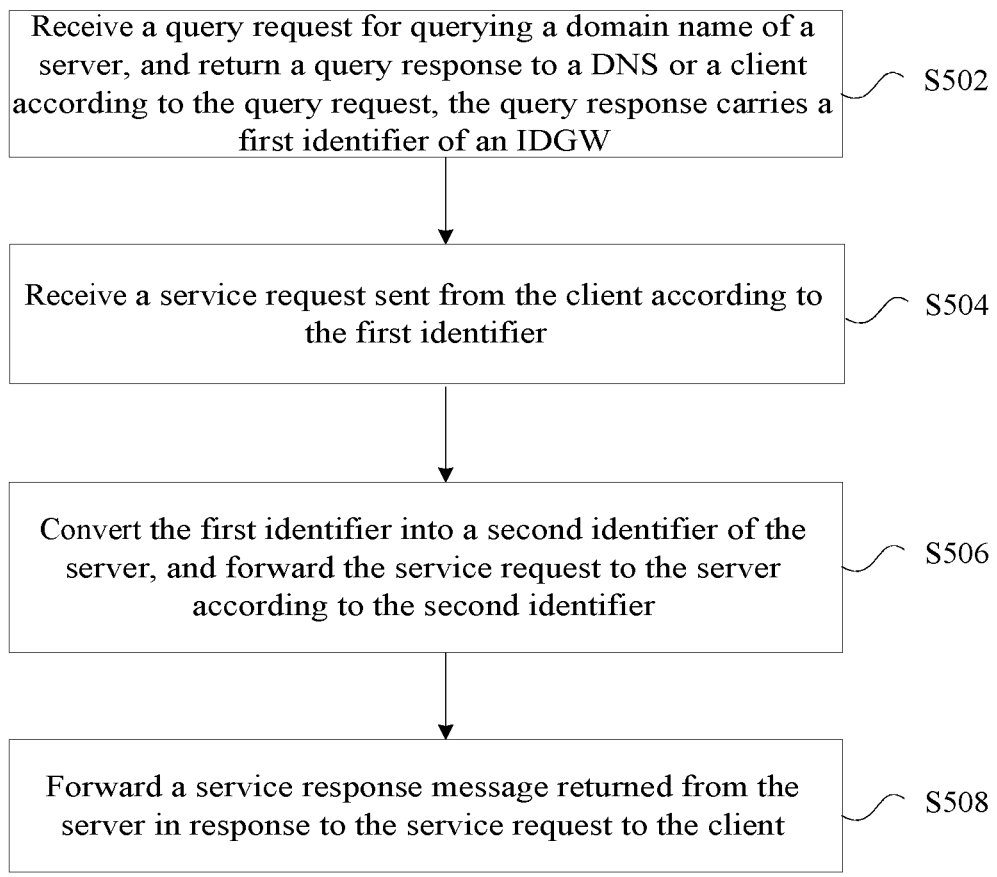
FIG. 5 is a third flowchart of a method for processing a service request according to an embodiment of the present disclosure.

According to still another embodiment of the disclosure, there is further provided a method for processing a service request. FIG. 5 is a third flowchart of a method for processing a service request according to an embodiment of the present disclosure. As shown in FIG. 5, the flow includes the following steps S502 to S508.

At step S502, a query request for querying a domain name of a server is received, and a query response to a DNS or a client is returned according to the query request, where the query response carries a first identifier of an IDGW.

At step S504, a service request sent from the client according to the first identifier is received.

At step S506, the first identifier is converted into a second identifier of the server, and the service request is forwarded to the server according to the second identifier.

At step S508, a service response message returned from the server in response to the service request is forwarded to the client.

Optionally, the query request carries an IP address of the client and one of: a domain name of a server to be queried; a second identifier corresponding to the domain name of the server; the domain name of the server and the corresponding second identifier.

Optionally, the step of receiving the query request for querying the domain name of the server and returning the query response to the DNS or client according to the query request includes: receiving the query request sent from the DNS; selecting a first identifier from a first identifier pool and establishing a mapping relationship among the IP address of the client, the first identifier and the second identifier; and returning the query response to the client via the DNS.

Optionally, the step of receiving the query request for querying the domain name of the server and returning the query response to the DNS or client according to the query request includes: receiving a mapping relationship among the IP address of the client, the first identifier and the second identifier sent from the DNS, where the mapping relationship is established after the DNS has selected the first identifier; and returning the query response to the client via the DNS.

Optionally, the step of receiving the query request for querying the domain name of the server and returning the query response to the DNS or client according to the query request includes: receiving the query request redirected by the client according to a response message, where the response message is sent to the client by the DNS after the DNS receives the query request; selecting a first identifier from a first identifier pool according to the query request and establishing a mapping relationship among the IP address of the client, the first identifier and the second identifier; and returning the query response to the client.

Optionally, the step of converting the first identifier into the second identifier of the server includes: converting the first identifier into the second identifier according to the mapping relationship.

Optionally, the step of forwarding the service response message returned from the server in response to the service request to the client includes: sending the service response message to the client according to the IP address of the client.

Optionally, before the step of sending the service response message to the client, the method further includes: receiving the service response message that carries the second identifier returned from the server; and converting the second identifier into the first identifier according to the mapping relationship.

Optionally, each of the first identifier and the second identifier is an IP address, or an IP address plus a communication port.

Optionally, the domain name of the server includes one of: a domain name of a service, a host name of the server, and a communication port of a service.

The embodiments of the disclosure are applied to MTD of the server, have an IDGW added between the client and the server as well as enhanced DNS function. When the client needs to access the server, specifically include: the client sends a query request for a domain name of the server to a DNS; the DNS dynamically parses domain name information of the same server into an identifier (i.e., the first identifier) managed by the IDGW, and returns the identifier to the client; the client takes the first identifier as a service request target and sends a service request to the IDGW; the IDGW converts the first identifier into a service identifier (i.e., the second identifier) of the server, and forwards the request to the server; and the response returned from the server is sent to the IDGW, converted by the IDGW and then sent to the client.

Optionally, the identifier refers to an IP address, or an IP address plus a communication port, which can represent the host address, or a service entrance provided by the host. The first identifier is an identifier managed by the IDGW, in which a plurality of identifiers managed by the IDGW form an identifier pool which takes a specific form of an IP address pool or an (IP address plus communication port) pool. The second identifier is an IP address of the server, or an IP address plus a communication port of the server. The domain name information of the server refers to a domain name of the service or a host name of the server, and may further include a communication port of the service.

The first identifier is selected by a selection strategy including randomly selecting one from the service identifier pool managed by the IDGW according to domain name information of the server, client information, time and other factors, and a mapping relationship among the client IP, the first identifier and the second identifier is established so that the second identifier may be uniquely determined through the first identifier or the client IP plus the first identifier.

The DNS sends a selection request for selecting a first identifier to the IDGW, and the IDGW executes the selection strategy for the first identifier and returns a result to the DNS; or the DNS uses a DNS iterative mechanism to make the client reinitiate a query request for the domain name to the IDGW, and the IDGW executes the selection strategy and returns the result to the client; or the DNS locally executes the selection strategy and then sends the established mapping relationship to the IDGW. The DNS sends a selection request carrying information about a client IP to the IDGW, and the DNS parsing result is set to be not cached or cached for a very short time, such as 120 seconds.

The client takes an IP address in the first identifier as a target address. If the first identifier contains communication port information, the port information is taken as a target port; otherwise, a default service port is used.

The IDGW checks the service request according to the mapping relationship among the client IP, the first identifier and the second identifier. If the client IP and the first identifier in the service request are matched with records in the mapping relationship, the conversion and sending process is executed; otherwise, the forwarding is refused to ensure that the first identifier is only accessible by a specified client. The IDGW converts a target IP address in the service request (i.e., the IP address in the first identifier) into an IP address corresponding to the second identifier, or converts the target IP address and a target port in the service request (i.e., the IP address and the communication port in the first identifier) into an IP address and a communication port corresponding to the second identifier, and then forwards the service request to a server corresponding to the second identifier.

After receiving a response from the server, the IDGW converts a source IP address in the response (i.e., the IP address corresponding to the second identifier) into the IP address in the first identifier, or converts a source IP address and a source port in the response (i.e., the IP address and the communication port corresponding to the second identifier) into the IP address and the communication port in the first identifier, and then forwards the response to the terminal. If the client or the server actively releases the communication connection or there is no service in a certain time, the IDGW actively releases connections with the client and the server, deletes the locally stored mapping relationship, and may further notify the DNS of releasing of the mapping relationship.

The embodiments of the present disclosure are described in detail below in conjunction with specific examples.

Example 1

Figure 6:
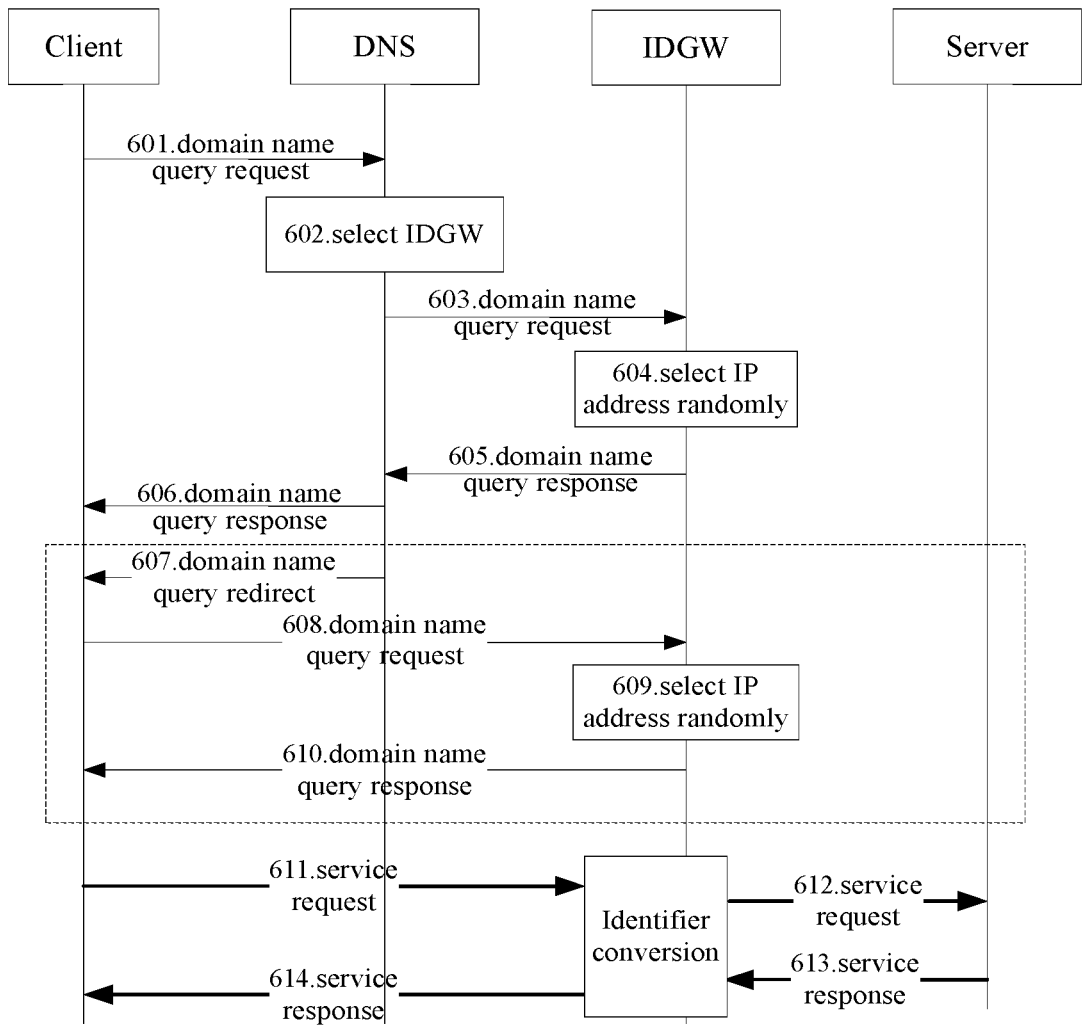
FIG. 6 is a first schematic diagram of a method for processing a service request according to an embodiment of the present disclosure.

FIG. 6 is a first schematic diagram of a method for processing a service request according to an embodiment of the present disclosure. As shown in FIG. 6, in this embodiment, both the first identifier and the second identifier are represented by an IP address identifier. Multiple IDGWs may exist in a network, each of which maintains an IP pool as the first identifier pool, and ranges of the IP address pools are not overlapped, for example, IDGW1 uses 3.3.3.1-3.3.3.254, while IDGW2 uses 3.3.4.1-3.3.4.254.

When a client wants to access a service of the internet, such as accessing a web site example.abc.com, an IP address of a server providing the service is 4.4.4.4, that is, the second identifier is 4.4.4.4, and a default communication port is 80. Then, the service access process includes the following steps 601 to 614.

At step 601, the client sends a query request for a domain name (example.abc.com) to a DNS.

At step 602, after receiving the query request, the DNS selects an IDGW providing the service.

At step 603, the DNS sends a query request for the domain name to the selected IDGW. The request carries the domain name (example.abc.com) to be queried, or a second identifier (4.4.4.4) corresponding to the domain name, or both, and an IP address of the client.

If the second identifier is to be carried, the DNS needs to query the corresponding second identifier locally or from other DNS server that manages server domain names.

At step 604, after receiving the request, the IDGW selects a first identifier (for example, 3.3.3.100) from the first identifier pool, and acquires a second identifier (4.4.4.4) corresponding to the domain name (example.abc.com) locally or from a DNS service managing the server, or acquires the second identifier from the request, thereby establishing a mapping relationship among the client IP address, the first identifier, and the second identifier.

The specific selection strategy is randomly selecting an unoccupied first identifier from the first identifier pool, or randomly selecting a first identifier which is not in a list (of client IP, first identifier, second identifier) from the first identifier pool. For the former, it is required that the corresponding second identifier should be uniquely determined from the first identifier; while in the latter case, the corresponding second identifier should be uniquely determined from the client IP and the first identifier, which can reduce the number of first identifiers in the maintained first identifier pool.

At step 605, the IDGW returns the selected first identifier to the DNS.

At step 606, the DNS returns a query response to the client, and the query response carries the first identifier of a domain name parsing result.

At step 611, the client uses the first identifier as a target IP address, and uses a default port to send a service request data packet to the IDGW.

At step 612, the IDGW queries a corresponding second identifier from the mapping relationship according to the client IP and the first identifier in the data packet, converts the first identifier into the second identifier, and sends the data packet to a server corresponding to the second identifier, in which the communication port in the data packet is not replaced during the conversion.

If no corresponding second identifier is found, it indicates that the first identifier is not allocated to the client, so the request is regarded as illegal data access and thus is discarded. The service request may also be recorded as suspicious access.

At step 613, the server processes services according to the service request and returns a response data packet, where the source IP address in the response data packet is the second identifier.

At step 614, the IDGW converts the second identifier in the source IP address of the data packet into the first identifier according to the mapping relationship, and then sends the data packet to the client, in which the communication port in the data packet is not replaced during the conversion.

During the domain name parsing process, a DNS iterative query mechanism may be used, the specific steps of which are shown as the following steps 607 to 610.

At step 607, after selecting the IDGW in step 602, a response is returned to notify the client to query the domain name to the IDGW.

At step 608, the client sends a query request for the domain name to the IDGW.

At step 609, which is the same as step 604, the IDGW selects the first identifier.

At step 610, the IDGW returns a query response to the client, and the query response carries the first identifier of a domain name parsing result.

Subsequent steps are the same as steps 611 to 614.

As can be seen from the above process, the client needs to access the server via the IDGW, and the IP addresses of the server acquired by different clients or by the same client at different times are different, thereby hiding the information of the real server.

Meanwhile, the IDGW may carry out validity check, and the allocated IP address is accessible by only a specified client. As a result, even if an attacker intercepts the IP address and uses the IP address to access the server, the IDGW will refuse the access, which improves the security of the server.

Example 2

Figure 7:
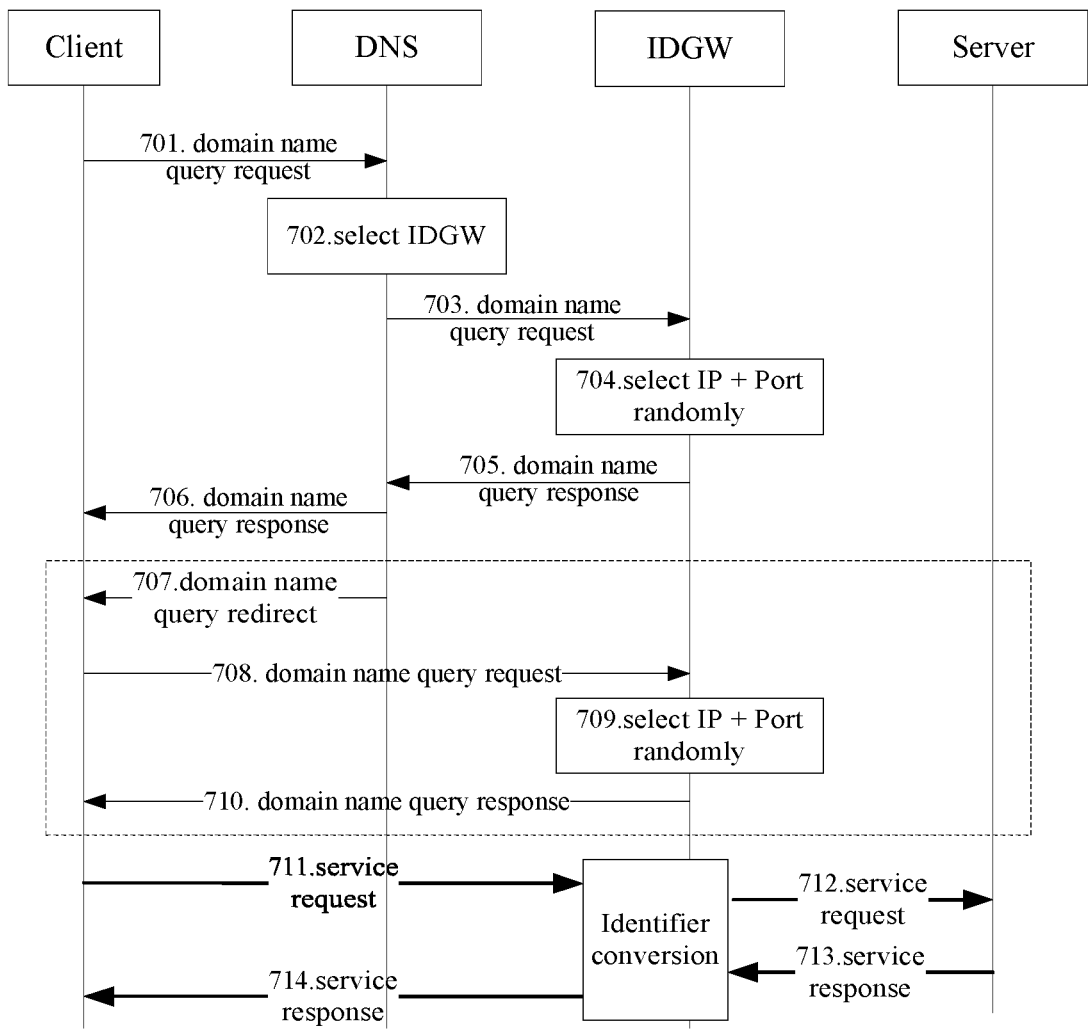
FIG. 7 is a second schematic diagram of a method for processing a service request according to an embodiment of the present disclosure.

FIG. 7 is a second schematic diagram of a method for processing a service request according to an embodiment of the present disclosure. As shown in FIG. 7, in this embodiment, both the first identifier and the second identifier are represented by an IP address plus a communication port, i.e., IP:port.

Multiple IDGWs may exist in a network, each of which maintains one or more IPs and uses IP:port as the first identifier pool. Since one IP address has 65535 ports, occupation of the IP address is reduced compared to Example 1. For example, IDGW1 uses 3.3.3.1-3.3.3.2, in which each address has 65535 ports available. Thus, a first identifier pool with a capacity of 12 ten thousand can be constructed by using two IP addresses.

When a client wants to access a service of the internet, such as accessing a web site example.abc.com, an IP address of the server providing the service is 4.4.4.4, and the communication port is 80, that is, the second identifier is 4.4.4.4:80. Then, the service access process includes the following steps 701 to 714.

At step 701, the client sends a query request for a domain name (example.abc.com) to a DNS, in which the communication port 80 of the server needs to be carried; otherwise, a protocol default port is used.

At step 702, after receiving the query request, the DNS selects an IDGW providing the service.

At step 703, the DNS sends a query request for the domain name to the selected IDGW. The request carries the domain name (example.abc.com) to be queried, the port, or a second identifier corresponding to the domain name, or the domain name, the second identifier corresponding to the domain name and the port, and an IP address of the client.

If the second identifier is to be carried, the DNS needs to query the corresponding second identifier locally or from other DNS server that manages server domain names.

At step 704, after receiving the request, the IDGW selects a first identifier from the first identifier pool, and acquires a second identifier corresponding to the domain name (example.abc.com) locally or from a DNS service managing the server, or acquires the second identifier from the request, thereby establishing a mapping relationship among the client IP address, the first identifier, and the second identifier. The first identifier and the second identifier are both in the form of an IP address plus a port.

The specific selection strategy is randomly selecting an unoccupied first identifier from the first identifier pool, or randomly selecting a first identifier which is not in a list (of client IP, first identifier, second identifier) from the first identifier pool. Since the first identifier pool of this embodiment has a large capacity, the former one is recommended.

At step 705, the IDGW returns the selected first identifier to the DNS, the first identifier including a communication port in addition to the IP address.

At step 706, the DNS returns a query response to the client, and the query response carries the first identifier of a domain name parsing result.

At step 711, the client uses an IP address in the first identifier as a target address, and uses the communication port as a destination port to send a service request data packet to the IDGW.

At step 712, the IDGW queries a corresponding second identifier from the mapping relationship according to the client IP and the first identifier in the data packet, converts the first identifier into the second identifier, that is, replaces the IP address of the data packet by the IP address in the second identifier, and replaces the destination port by the communication port in the second identifier, and sends the data packet to a server corresponding to the second identifier.

If no corresponding second identifier is found, the request is regarded as illegal data access and thus is discarded.

At step 713, the server processes services according to the service request and returns a response data packet, where the source IP address in the response data packet is the IP address in the second identifier, and the source port is the communication port of the second identifier.

At step 714, the IDGW converts the second identifier in the source IP address of the data packet into the first identifier according to the mapping relationship, that is, replaces the source IP of the data packet by the IP address in the first identifier, and replaces the destination port by the communication port in the first identifier, and sent the data packet to the client.

During the domain name parsing process, a DNS iterative query mechanism may be used, the specific steps of which are shown as steps 707 to 710 and similar to steps 607 to 610, and thus are not repeated here.

Compared with the Example 1, the method described in this embodiment uses the port as a part of the identifier, saving a large number of IP addresses, but the terminal needs to carry the port when performing domain name parsing, and the port selected by the IDGW is used as the destination port.

As can be seen from the above procedure, the client needs to access the server via the IDGW, and the IP:ports of the server acquired by different clients at different times are different, thereby hiding the information of the real server. Meanwhile, the IDGW will carry out validity check, and the IP:port assigned the first identifier is accessible by only a specified client. If an attacker intercepts the IP address and port, and uses the IP address and port to access the server, the IDGW will refuse the access, which improves the security of the server.

Example 3

Figure 8:
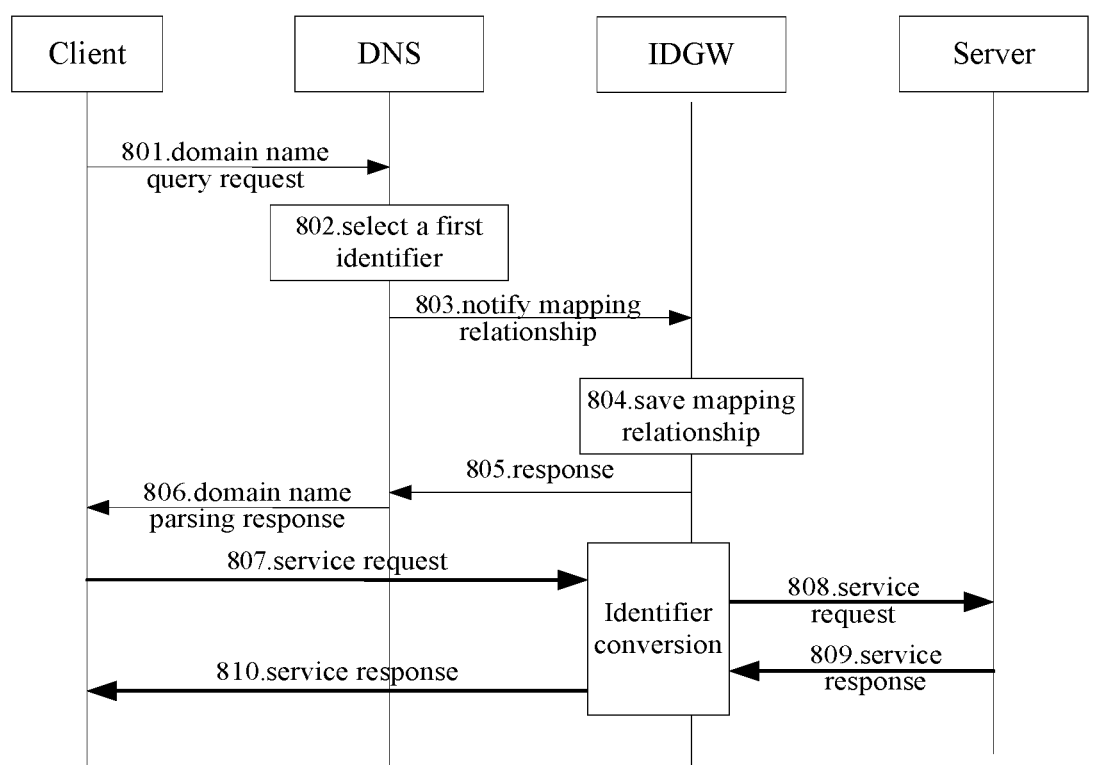
FIG. 8 is a third schematic diagram of a method for processing a service request according to an embodiment of the present disclosure.

FIG. 8 is a third schematic diagram of a method for processing a service request according to an embodiment of the present disclosure. As shown in FIG. 8, in this embodiment, the first identifier and the second identifier may adopt the manner of Example 1 or 2, and are mainly different from the foregoing manners in that the DNS stores first identifier pools maintained by different IDGWs, and the DNS selects the IDGW and the first identifier in a unified manner, and notifies the client as well as the IDGW of the selecting result.

At step 801, the client sends a query request for a domain name to a DNS.

At step 802, the DNS selects the IDGW and the first identifier, and establishes a mapping relationship (among the user IP, the first identifier and the second identifier).

At step 803, the DNS sends the mapping relationship to the IDGW.

At step 804, the IDGW stores the mapping relationship.

At step 805, the IDGW returns a response.

At step 806, the DNS returns the first identifier to the terminal.

The subsequent service request process is the same as steps 611 to 614 or steps 711 to 714.

In the above embodiment, when the client or the server actively releases the connection, or there is no service flow on the established connection for a long time, the IDGW may actively delete the established or stored mapping relationship, and release the first identifier into the first identifier pool again. In an embodiment, the IDGW will further notify the DNS to delete the established mapping relationship.

Through the above steps, the problems with fixed service entrance and public information of the server in the related art can be solved, and the entrance of the server is random and dynamic so that it is difficult for an attacker to initiate an attack, increasing the attack cost and thus improving the network security.

Through the description of the above implementations, those skilled in the art can clearly understand that the method according to the above embodiment may be implemented by means of software plus a necessary general hardware platform. Obviously, it may also be implemented by hardware, but in most cases, the former is preferable. Based on such understanding, the technical solutions of the present invention essentially or, in other words, a part thereof contributing to the related art, can be embodied in a form of a software product, wherein the software product is stored in a storage medium (such as an ROM/RAM, a disk, or an optical disc) and includes a number of instructions to make a terminal device (which may be a mobile phone, a computer, a server, or a network device, etc.) to execute the methods of the various embodiments of the present disclosure.

Embodiment 4

Figure 9:
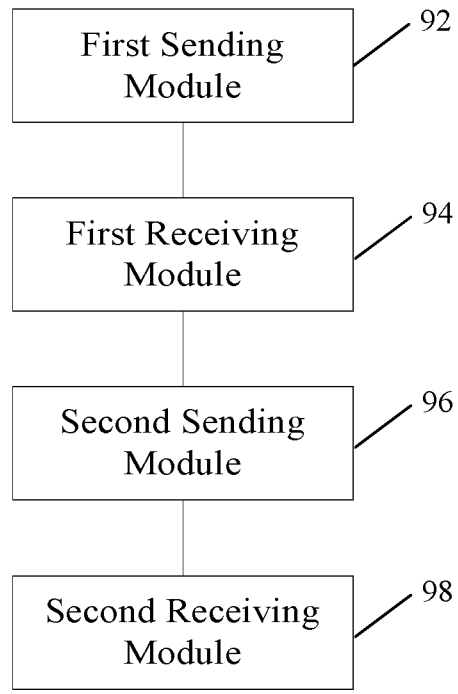
FIG. 9 is a first block diagram of an apparatus for processing a service request according to an embodiment of the present disclosure.

In this embodiment, there is further provided an apparatus for processing a service request configured to implement the above embodiment and preferable implementations. Details which have been explained will not be repeated here. As used herein, the term "module" may be a combination of software and/or hardware that can realize a preset function. The devices described in the following embodiments are preferably implemented in software, but hardware, or a combination of software and hardware, is also possible and contemplated. FIG. 9 is a first block diagram of an apparatus for processing a service request according to an embodiment of the present disclosure. As shown in FIG. 9, the apparatus is applied to a client and includes a first sending module 92, a first receiving module 94, a second sending module 96 and a second receiving module 98.

The first sending module 92 is configured to send a query request for querying a domain name of a server to a DNS.

The first receiving module 94 is configured to receive a query response returned according to the query request, where the query response carries a first identifier of an IDGW.

The second sending module 96 is configured to sending a service request to the IDGW according to the first identifier, where the service request is used for the IDGW to convert the first identifier into a second identifier of the server and forward the service request to the server according to the second identifier.

The second receiving module 98 is configured to receive a service response message returned from the server in response to the service request.

Optionally, the query request carries the domain name of the server to be queried and an IP address of the client.

Optionally, the first sending module 92 is further configured to send the query request to the DNS, where the query request is used for the DNS to select the IDGW according to the domain name of the server in a random or alternate manner, forward the query request to the selected IDGW so that the IDGW selects a first identifier from a first identifier pool and establishes a mapping relationship among the IP address of the client, the first identifier and the second identifier, and receive the first identifier selected by the IDGW.

Alternatively, the first sending module 92 is further configured to send the query request to the DNS, where the query request is used for the DNS to select the IDGW and a first identifier according to the domain name of the server in a random or alternate manner, establish a mapping relationship among the IP address of the client, the first identifier and the second identifier, and send the mapping relationship to the selected IDGW.

Optionally, the first sending module 92 is further configured to: send the query request to the DNS, where the query request is used for the DNS to select the IDGW according to the domain name of the server in a random or alternate manner; receive a response message returned from the DNS, where the response message is used for indicating that the query request is sent to the IDGW; and redirect the query request to the IDGW according to the response message, where the query request is used for the IDGW to select the first identifier from a first identifier pool and establish a mapping relationship among the IP address of the client, the first identifier and the second identifier.

Embodiment 5

Figure 10:
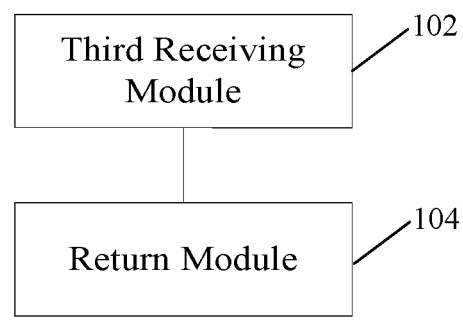
FIG. 10 is a second block diagram of an apparatus for processing a service request according to an embodiment of the present disclosure.

According to still another embodiment of the disclosure, there is further provided an apparatus for processing a service request. FIG. 10 is a second block diagram of an apparatus for processing a service request according to an embodiment of the present disclosure. As shown in FIG. 10, the apparatus is applied to a Domain Name Server (DNS) and includes a third receiving module 102 and a return module 104.

The third receiving module 102 is configured to receive a query request for querying a domain name of a server sent from a client.

The return module 104 is configured to return a query response to the client according to the query request, where the query response carries a first identifier of an IDGW, the first identifier is used for the client to send a service request to the IDGW, the service request is used for the IDGW to convert the first identifier into a second identifier of the server and forward the service request to the server according to the second identifier, and forward a service response message returned from the server in response to the service request to the client.

Optionally, the query request carries the domain name of the server to be queried and an IP address of the client.

Optionally, the return module 104 is further configured to: select the IDGW according to the domain name of the server in a random or alternate manner; forward the query request to the selected IDGW, where the query request is used for the IDGW to select the first identifier from a first identifier pool and establish a mapping relationship among the IP address of the client, the first identifier and the second identifier; receive the first identifier selected by the IDGW; and return the query response to the client.

Optionally, the return module 104 is further configured to: select the IDGW and the first identifier according to the domain name of the server in a random or alternate manner; establish a mapping relationship among the IP address of the client, the first identifier and the second identifier, and send the mapping relationship to the selected IDGW; and return the query response to the client.

Optionally, the return module 104 is further configured to: select the IDGW according to the domain name of the server in a random or alternate manner; return a response message to the client, where the response message is used for the client to redirect the query request to the IDGW, the query request is used for the IDGW to select the first identifier from a first identifier pool and establish a mapping relationship among the IP address of the client, the first identifier and the second identifier; and return the query response to the client through the IDGW.

Embodiment 6

Figure 11:
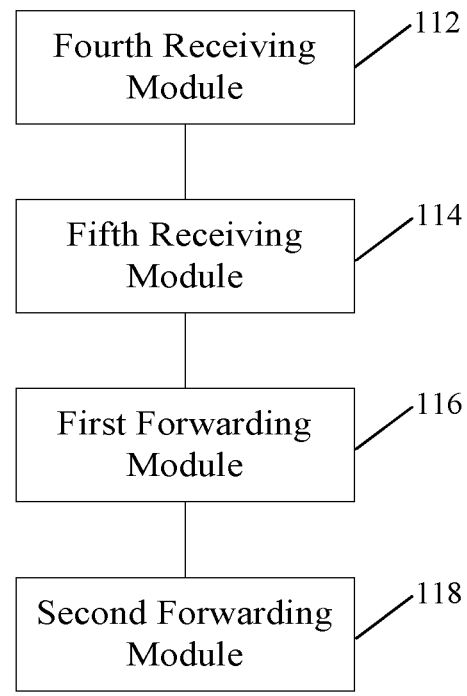
FIG. 11 is a third block diagram of an apparatus for processing a service request according to an embodiment of the present disclosure.

According to still another embodiment of the disclosure, there is further provided an apparatus for processing a service request. FIG. 11 is a third block diagram of an apparatus for processing a service request according to an embodiment of the present disclosure. As shown in FIG. 11, the apparatus is applied to an Identification Gateway (IDGW) and includes a fourth receiving module 112, a fifth receiving module 114, a first forwarding module 116 and a second forwarding module 118.

The fourth receiving module 112 is configured to receive a query request for querying a domain name of a server, and return a query response to a DNS or a client according to the query request, where the query response carries a first identifier of the IDGW.

The fifth receiving module 114 is configured to receive a service request sent from the client according to the first identifier.

The first forwarding module 116 is configured to convert the first identifier into a second identifier of the server, and forward the service request to the server according to the second identifier.

The second forwarding module 118 is configured to forward a service response message returned from the server in response to the service request to the client.

Optionally, the query request carries an IP address of the client and one of: a domain name of a server to be queried; the second identifier corresponding to the domain name of the server to be queried; and the domain name of the server to be queried and the second identifier corresponding to the domain name of the server to be queried.

Optionally, the fourth receiving module 112 is further configured to: receive the query request sent from the DNS; select the first identifier from a first identifier pool and establish a mapping relationship among the IP address of the client, the first identifier and the second identifier; and return the query response to the client via the DNS.

Optionally, the fourth receiving module 112 is further configured to: receive the mapping relationship among the IP address of the client, the first identifier and the second identifier sent from the DNS, where the mapping relationship is established after the DNS has selected the first identifier; and return the query response to the client via the DNS.

Optionally, the fourth receiving module 112 is further configured to: receive the query request redirected by the client according to a response message, where the response message is sent to the client by the DNS after the DNS receives the query request; select the first identifier from a first identifier pool according to the query request and establish a mapping relationship among the IP address of the client, the first identifier and the second identifier; and return the query response to the client.

Optionally, the second forwarding module 118 is further configured to send the service response message to the client according to the IP address of the client.

It should be noted that each of the above modules may be implemented by software or hardware. For the latter, it may be implemented by, but are not limited to: the above modules all located in the same processor; or the above modules each located in different processors in any combination.

Embodiment 7

Figure 12:
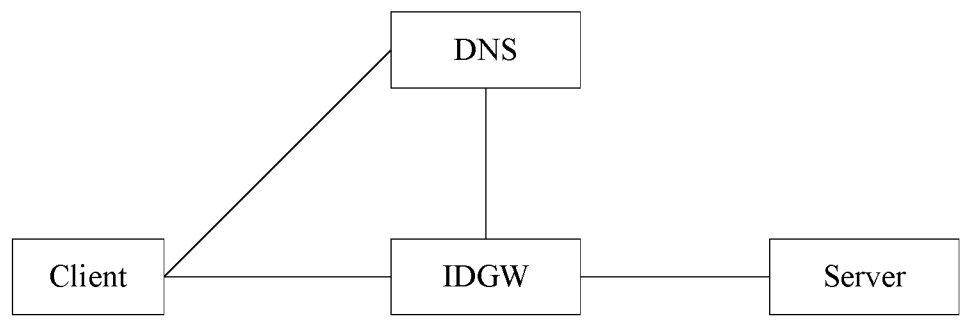
FIG. 12 is a block diagram of a system for processing a service request according to an embodiment of the present disclosure.

In an embodiment the present disclosure, there is further provided a system for processing a service request. FIG. 12 is a block diagram of a system for processing a service request according to an embodiment of the present disclosure. As shown in FIG. 12, the method includes: a client, a DNS, an IDGW and a server.

The client is configured to send a query request for querying a domain name of the server to the DNS.

The DNS is configured to return a query response to the client according to the query request, where the query response carries a first identifier of the IDGW.

The IDGW is configured to receive a service sending request sent from the client, convert the first identifier into a second identifier of the server, and forward the service request to the server according to the second identifier.

The server is configured to return a service response message in response to the service request to the client via the IDGW according to the service request.

Optionally, the query request carries the domain name of the server to be queried and an IP address of the client.

Optionally, the DNS is further configured to select the IDGW according to the domain name of the server in a random or alternate manner and forward the query request to the selected IDGW; and the IDGW is further configured to: select the first identifier from a first identifier pool and establish a mapping relationship among the IP address of the client, the first identifier and the second identifier; and send the first identifier to the client via the DNS.

Optionally, the DNS is further configured to: select the IDGW and the first identifier according to the domain name of the server in a random or alternate manner, establish a mapping relationship among the IP address of the client, the first identifier and the second identifier, and send the mapping relationship to the selected IDGW; and return the query response to the client.

Optionally, the DNS is further configured to select the IDGW according to the domain name of the server in a random or alternate manner; return a response message for sending the query request to the selected IDGW to the client; the client is further configured to redirect the query request to the IDGW according to the response message; and the IDGW is further configured to: select the first identifier from a first identifier pool and establish a mapping relationship among the IP address of the client the first identifier and the second identifier; and return the query response to the client.

Optionally, the IDGW is further configured to receive the service response message that carries the second identifier returned from the server, convert the second identifier into the first identifier according to the mapping relationship, and send the service response message to the client according to the first identifier.

Optionally, each of the first identifier and the second identifier is an IP address, or an IP address plus a communication port.

Optionally, the server domain name information includes one of: a domain name of a service, a host name of the server, and a communication port of a service.

Functions of the respective network elements are explained in detail below.

Client: the client initiates service access by using a domain name of a server, sends a query request for the domain name to the DNS, and may further carry port information of the server in the DNS query request; and sends, according to the first identifier information in a response returned from the DNS, a service request to the IDGW by using an IP address in the first identifier and a default communication port or an IP address and a communication port in the first identifier, and receive the service response returned from the IDGW.

Server: the server provides a service to the client through an IP address and a communication port in the second identifier.

DNS: the existing DNS is enhanced to support the following characteristics:

receiving the DNS query request sent from a client, and selecting an IDGW;

serving as a proxy to query the first identifier corresponding to the domain name to the selected IDGW, or using a substitution mechanism to indicate the client to directly send the DNS query request to the selected IDGW, or randomly selecting an identifier in a first identifier pool managed by the IDGW according to a parsing strategy and informing the IDGW of a selection result; and returning the selection result to the client.

IDGW: IDGW is located between the client and the server and responsible for maintaining and allocating the first identifier, hiding the second identifier and converting between the first identifier and the second identifier, thereby providing a safety protection function for the server. The IDGW has the following specific characteristics:

1) responsible for managing the first identifier pool;

2) upon receiving a query request for a domain name from the DNS or the client, the IDGW randomly selects the first identifier from the first identifier pool according to a strategy, establishes a mapping relationship among the client, the first identifier and a second identifier, and returns a selection result to the client directly or via the DNS; or after receiving a DNS selection result, establishes a mapping relationship among the client, the first identifier and the second identifier;

3) upon receiving a service request, the IDGW performs a conversion from the first identifier to the second identifier according to the mapping relationship; and upon receiving the corresponding service response, performs a conversion from the second identifier to the first identifier according to the mapping relationship; and 4) IDGW maintains the mapping relationship, and performs authority control on data packets so that only a data packet which conforms to the mapping relationship is forwarded.

Embodiment 8

In an embodiment of the present disclosure, there is further provided a storage medium having a computer program stored thereon, the computer program, when executed by a processor, cause the processor to perform any of the method embodiments as described above.

Optionally, in this embodiment, the storage medium may also be configured to store a computer program for implementing steps of S11 to S14.

At step S11, sending a query request for querying a domain name of a server to a DNS.

At step S12, receiving a query response returned according to the query request, where the query response carries a first identifier of an IDGW.

At step S13, sending a service request to the IDGW according to the first identifier, where the service request is used for the IDGW to convert the first identifier into a second identifier of the server and forward the service request to the server according to the second identifier.

At step S14, receiving a service response message returned from the server in response to the service request.

Optionally, the storage medium is further configured to store a computer program for implementing steps of S21 to S22.

At step S21, receiving a query request for querying a domain name of a server sent from a client.

At step S22, returning a query response to the client according to the query request, where the query response carries a first identifier of an IDGW, the first identifier is used for the client to send a service request to the IDGW, the service request is used for the IDGW to convert the first identifier into a second identifier of the server and forward the service request to the server according to the second identifier, and forward a service response message returned from the server in response to the service request to the client.

Optionally, the storage medium is further configured to store a computer program for implementing steps of S31 to S34.

At step S31, receiving a query request for querying a domain name of a server, and returning a query response to a DNS or a client according to the query request, where the query response carries a first identifier of an IDGW.

At step S32, receiving a service request sent from the client according to the first identifier.

At step S33, converting the first identifier into a second identifier of the server, and forwarding the service request to the server according to the second identifier.

At step S34, forwarding a service response message returned from the server in response to the service request to the client.

Optionally, in this embodiment, the storage medium may include, but is not limited to: a U disk, a read-only memory (ROM), a random access memory (RAM), a mobile hard disk, a disk or optical disk, and other media that can store a computer program.

Embodiment 9

In an embodiment of the present disclosure, there is further provided an electronic device, including a memory and a processor. The memory corresponds to the "memory 104" in FIG. 2, that is, the memory 104 in FIG. 2 can be used as a type of memory in the electronic device. The memory has a computer program stored thereon, and the processor is configured to execute the computer program to perform steps of any of the method embodiments as described above.

Optionally, the electronic device may further include a transmission device and an input-output device, and the transmission device and the input-output device are coupled to the processor.

Optionally, in this embodiment, the processor may be configured to perform the following steps S11 to S14 by executing the computer program.

At step S11, sending a query request for querying a domain name of a server to a DNS.

At step S12, receiving a query response returned according to the query request, where the query response carries a first identifier of an IDGW.

At step S13, sending a service request to the IDGW according to the first identifier, where the service request is used for the IDGW to convert the first identifier into a second identifier of the server and forward the service request to the server according to the second identifier.

At step S14, receiving a service response message returned from the server in response to the service request.

Optionally, in this embodiment, the processor may be further configured to execute the following steps S21 to S22 by executing the computer program.

At step S21, receiving a query request for querying a domain name of a server sent from a client.

At step S22, returning a query response to the client according to the query request, where the query response carries a first identifier of an IDGW, the first identifier is used for the client to send a service request to the IDGW, the service request is used for the IDGW to convert the first identifier into a second identifier of the server and forward the service request to the server according to the second identifier, and forward a service response message returned from the server in response to the service request to the client.

Optionally, in this embodiment, the processor may be further configured to execute the following steps S31 to S34 by executing the computer program.

At step S31, receiving a query request for querying a domain name of a server, and returning a query response to a DNS or a client according to the query request, where the query response carries a first identifier of an IDGW.

At step S32, receiving a service request sent from the client according to the first identifier.

At step S33, converting the first identifier into a second identifier of the server, and forwarding the service request to the server according to the second identifier.

At step S34, forwarding a service response message returned from the server in response to the service request to the client.

Optionally, specific examples in the present embodiment may refer to the examples described in the foregoing embodiments and alternative implementations, which will not be repeated in the present embodiment.

Obviously, a person skilled in the art would understand that the above modules and steps of the present disclosure can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only preferred embodiments of the present disclosure, which are not used to restrict the present disclosure. For those skilled in the art, the present disclosure may have various changes and variations. Any amendments, equivalent substitutions, improvements, etc. within the principle of the disclosure are all included in the scope of the protection defined by the appended claims of the disclosure.

INDUSTRIAL APPLICABILITY

As described above, the method and apparatus for processing a service request provided in the embodiments of the present disclosure have the following beneficial effects: solving the problem in the related art that normal services are affected when a server randomly changes a parameter, realizing active protection of a target server, and improving security of the entire server system.

What is claimed is:

1. A method for processing a service request, comprising:
  receiving, by a Domain Name Server (DNS), a query request for querying a domain name of a server sent from a client; wherein the query request carries the domain name of the server to be queried and an IP address of the client;
  selecting, by the DNS, an Identification Gateway (IDGW) according to the domain name of the server in a random or alternate manner; and
  returning directly, by the DNS, a query response to the client according to the query request;
  wherein the query response carries a first identifier of the IDGW; the first identifier is used for the client to send a service request to the IDGW; the service request is used for the IDGW to convert the first identifier into a second identifier of the server and forward the service request to the server according to the second identifier, and for the server to return a service response message to the client in response to the service request,
  wherein after selecting the IDGW according to the domain name of the server in the random or alternate manner, and before returning directly the query response to the client according to the query request, the method further comprises:
  forwarding, by the DNS, the query request to the selected IDGW, wherein the query request is used for the IDGW to select the first identifier from a first identifier pool and establish a mapping relationship among the IP address of the client, the first identifier and the second identifier; and
  receiving, by the DNS, the first identifier selected by the IDGW.

2. The method according to claim 1, after selecting the IDGW according to the domain name of the server in the random or alternate manner, and before returning directly the query response to the client according to the query request, comprising:
  selecting, by the DNS, the first identifier;
  establishing, by the DNS, a mapping relationship among the IP address of the client, the first identifier and the second identifier; and
  sending, by the DNS, the mapping relationship to the selected IDGW.

3. A method for processing a service request, comprising:
receiving, by an Identification Gateway (IDGW), a service request sent from a client according to a first identifier of the IDGW; wherein the first identifier is obtained by the client through sending a query request for querying a domain name of a server to a Domain Name Server (DNS) and receiving a query response carrying the first identifier directly returned by the DNS according to the query request; wherein the query request carries the domain name of the server to be queried and an IP address of the client, and is used for the DNS to select the IDGW according to the domain name of the server in a random or alternate manner; and
converting, by the IDGW, the first identifier into a second identifier of the server, and forwarding the service request to the server according to the second identifier; wherein the service request is used for the server to return a service response message to the client in response to the service request,
wherein before receiving the service request sent from the client according to the first identifier of the IDGW, the method further comprises:
receiving, by the IDGW, the query request sent from the DNS;
selecting, by the IDGW, the first identifier from a first identifier pool and establishing a mapping relationship among the IP address of the client, the first identifier and the second identifier; and
returning, by the IDGW, the first identifier to the DNS.

4. The method according to claim 3, before receiving the service request sent from the client according to the first identifier of the IDGW, further comprising:
receiving, by the IDGW, a mapping relationship among the IP address of the client, the first identifier and the second identifier sent from the DNS; wherein the mapping relationship is established by the DNS after the DNS has selected the first identifier.

5. A non-transitory computer-readable storage medium, having a computer program stored thereon, wherein the computer program, when executed by a processor, cause the processor to perform the method of claim 1.

6. A non-transitory computer-readable storage medium, having a computer program stored thereon, wherein the computer program, when executed by a processor, cause the processor to perform the method of claim 3.

7. An electronic device, comprising a memory and a processor, wherein the memory has a computer program stored thereon, the processor is configured to execute the computer program to perform the method of claim 1.

8. An electronic device, comprising a memory and a processor, wherein the memory has a computer program stored thereon, the processor is configured to execute the computer program to perform the method of claim 3.

* * * * *